June 2, 1970 R. A. SOETERS 3,515,105
IGNITION SYSTEM
Original Filed Nov. 17, 1966
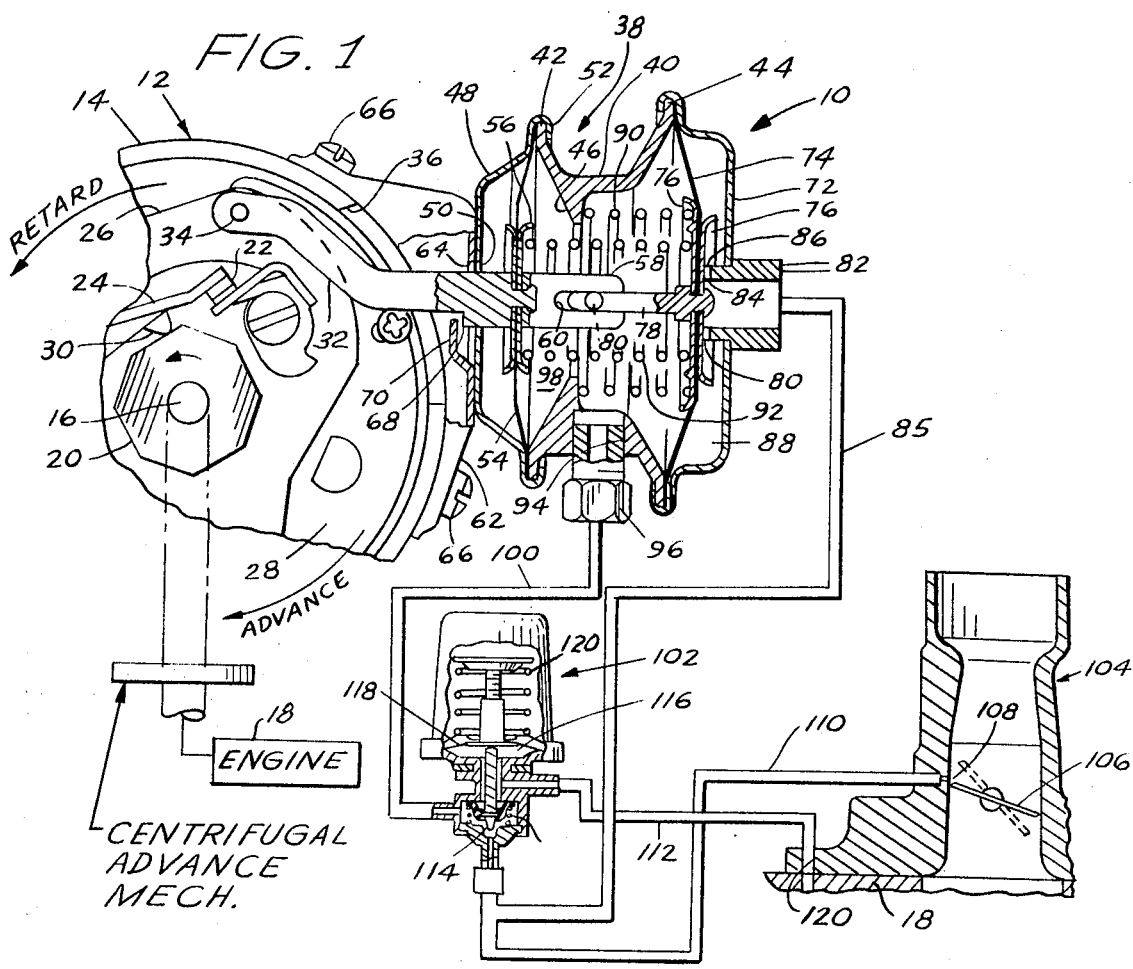
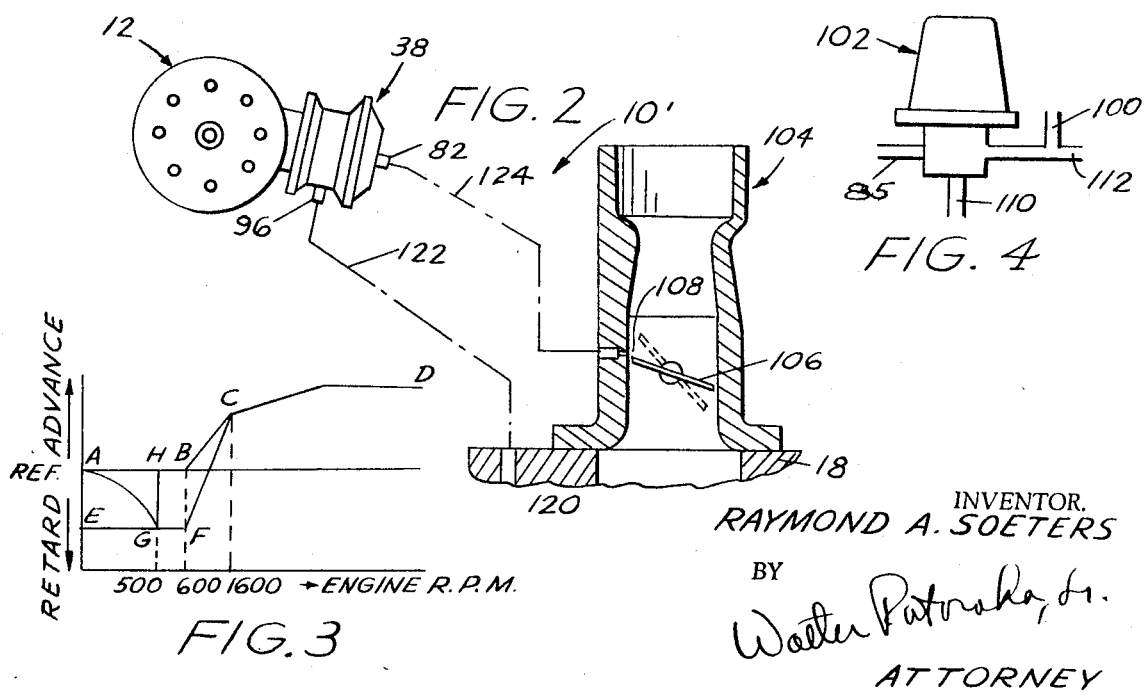
INVENTOR.
RAYMOND A. SOETERS
BY
Walter Patrinko Jr.
ATTORNEY United States Patent Office 3,515,105
Patented June 2, 1970

3,515,105
IGNITION SYSTEM
Raymond A. Soeters, Royal Oak, Mich., assignor to Holley Carburetor Company, Warren, Mich., a corporation of Michigan
Continuation of application Ser. No. 595,176, Nov. 17, 1966. This application Apr. 18, 1969, Ser. No. 824,724
Int. Cl. F02p 5/04, 1/00
U.S. Cl. 123—117                          11 Claims

ABSTRACT OF THE DISCLOSURE

A control device for advancing and retarding the timing of an associated ignition distributor in accordance with selected parameters of engine operation and in response to engine and/or carburetor controlled vacuum has a general housing containing spaced first and second pressure responsive diaphragms peripherally retained within the housing in a manner defining at least a first chamber between the diaphragms and a second chamber between the second diaphragm and a wall of the housing; the diaphragms, operatively connected to each other by lost-motion linkage, are resiliently urged away from each other by a first spring operatively engaging each of the diaphragms; a second spring seated on a fixed seat normally urges the second diaphragm away from the first diaphragm and toward a cooperating abutment portion; the first diaphragm is connected to an actuating linkage adapted for connection to the ignition distributor to transfer thereto motion which results in either advancing or retarding the ignition-timing; and each of the first and second chambers being provided with conduit means suitable for connection to a source of vacuum controlled by the carburetor or generated by the engine in order to actuate either or both of said diaphragms in order to create the desired advance or retard of ignition timing in accordance therewith.

---

This application is a continuation of Ser. No. 595,176, filed Nov. 17, 1966, and now abandoned.

This invention relates generally to internal combustion engines, and specifically to an engine ignition system including a novel vacuum diaphragm assembly connected to that portion of the engine ignition distributor that is movable to advance and retard the spark timing, the diaphragm assembly being adapted for connection to the engine in a plurality of arrangements to provide ignition systems capable to retarding the spark during idle and, if desired, to retard or advance the spark timing during engine deceleration, as may be required in various engine applications for exhaust emission control purposes, without effecting spark timing at other engine operating conditions.

Existing state laws and expected Federal laws relating to the control of engine exhaust emissions have, of course, resulted in engine modifications directed toward reduction of exhaust emissions. Since this subject is not yet completely understood, a variety of approaches, based on different theories being employed, are in use. Some major engine manufacturers employ the so-called air injection system to treat exhaust gases as they enter the exhaust system; others prefer a so-called engine modification system wherein various methods are employed to control the quality of the exhaust leaving the engine.

It has been proposed in the past that a substantial spark advance during engine deceleration would both reduce the tendency to backfire during deceleration and reduce the unburned hydrocarbon content of the exhaust, apparently on the theory that this advanced spark would provide more time for the poor-burning mixture to burn more completely.

More recently, it is being proposed to retard the spark at idle in some engines, and possibly during deceleration, apparently on the theory that a retarded spark will give more time for the poor-burning rich mixture delivered to the engine to burn more completely just prior to its discharge from the cylinder to the exhaust system. The success of this theory appears to be related, at least to some extent, to cylinder head design, and some engine manufacturers are known to be redesigning their engines for this purpose.

A review of the prior art indicates that a number of devices have been proposed for varying the ignition timing for a number of reasons. Some of the stated functions of these previously proposed devices are modification of the normal timing advance curve to (a) retard the spark at idle and/or on deceleration or at any time that the throttle is closed, (b) retard the spark at low speed deceleration and to advance the spark at high speed deceleration, (c) to advance the spark on deceleration, (d) to crank at reference timing, retard the spark at idle and thereafter advance the spark and (e) to retard spark and crack the throttle open on deceleration. It is not clear how some of these prior art devices function under other engine operating conditions.

Many of these prior art devices for effecting modification of the engine timing usually necessarily include, in addition to the usual distributor vacuum diaphragm assembly, some sort of a spark timing control valve. Also, many of these devices include two separate distributor diaphragm assemblies, one to retard and one to advance the timing, depending upon the mode of the timing control valve. Further, many of these systems require a pair of vacuum pick-up ports in the carburetor, one on each side of the throttle plate, it being important to the operation of the system that the vacuum pick-up ports be accurately located with respect to the throttle valve. Still further, many of these systems are designed for a particular function and cannot be modified simply to provide a somewhat different function to meet different engine requirements; that is, they lack flexibility.

Accordingly, a main object of this invention is to provide an ignition system including an ignition distributor diaphragm assembly that may be interchangeable with prior art diaphragm assemblies, applicable for full pressure distributors but specifically for use with distributors having the well known mechanical centrifugal advance system and a vacuum part-throttle advance system, and that may be employed with various carburetor configurations, with or without various other so-called spark timing control valves and the like, for the purpose of operating the ignition distributor spark timing mechanism in the normal manner known in the prior art for maximum performance and economy under normal road load and accelerating conditions, but for retarding the spark timing beyond the normal firing point under certain engine operating conditions, such as at idle and during engine deceleration, for emission control purposes.

More specifically, an object of the invention is to provide a double diaphragm assembly that may be simply substituted for the prior art vacuum advance mechanism and wherein means connecting the two diaphragms is arranged in such a way that normal operation of the diaphragm connected to the distributor advance mechanism is modified under certain engine operations to retard the spark.

Another object of the invention is to provide such a diaphragm assembly that is designed in a manner so that its function can be tailored to the needs of any particular engine by the use of appropriate vacuum pick-ups and/or vacuum operated spark valves or other similar devices. The proposed diaphragm assembly affords engine manufacturers considerable engine modification flexibility because they can either use a prior art distributor in a normal manner or use applicant's diaphragm assembly, without any change in the ignition distributor design or calibration and with or without change in the carburetor vacuum pick-ups or use of vacuum-operated spark valves, to provide standard engines in which exhaust emission is controlled by a retarded or advanced spark under certain engine operating conditions.

Another object of the invention is to provide such a diaphragm assembly in which one normally operating diaphragm is modified by the operation of another diaphragm having a greater effective area.

Another object of the invention is to provide such an assembly having means for limiting maximum spark retard to some predetermined value.

Still another object of the invention is to provide such an assembly wherein sliding shaft or flexing seals, which may cause malfunction due to accumulation of dirt or seal failure, are eliminated.

Another object of the invention is to provide ignition systems, including such a novel diaphragm assembly, capable of retarding the spark during idle or during idle and deceleration or of retarding the spark during idle and advancing the spark during deceleration.

Another object of the invention is to provide such systems that will give the desired function without requiring additional carburetor vacuum pick-up ports, and particularly without requiring accurately pisitioned carburetor ports positioned on opposite sides of the throttle plate. The latter adds cost because it is sometimes difficult and expensive to machine additional ports and their associated channels, especially in four-barrel carburetors where one of the ports may have to be located between primary and secondary barrels.

A still further object of the invention is to provide such a diaphragm assembly which, in most cases, may be employed with carburetors having the standard single vacuum pick-up port and the standard ignition distributor so that no change in the carburetor or the distributor is required when incorporating applicant's device in the ignition system. It will be understood by persons skilled in the art that anything that promotes standardization in the automotive industry is highly desirable.

Another object of the invention is to provide such a diaphragm assembly that may be employed, with a valve accessory already proposed for use with prior art distributors to provide emission control by advancing the spark on deceleration, for engines also requiring a spark retarded idle, again promoting standardization.

Another object of the invention is to provide novel ignition systems capable of such operation, but wherein cranking of the engine is with a normal unretarded spark timing.

These and other objects and advantages of the invention will become apparent by reference to the following specification and the accompanying drawings wherein:

FIG. 1 is a schematic illustration of an ignition system embodying the invention for retarding the spark only on deceleration, the proposed novel diaphragm assembly being shown in detail and the system including a control valve assembly of the type presently employed with the prior art distributor and carburetor shown to advance the spark on deceleration.

FIG. 2 is a schematic view, partly in cross-section, illustrating another ignition system, including only the novel diaphragm assembly and the prior art ignition distributor and carburetor shown in FIG. 1, for retarding the spark at idle and during deceleration;

FIG. 3 is a graph comparing performance of a system using applicant's novel diaphragm assembly with that of a prior art system having no idle retard and having idle retard provided by other means; and FIG. 4 illustrates a different manner of connecting the control valve in the system shown in FIG. 1 to retard the spark at idle and to advance the spark during deceleration.

Referring now to FIG. 1, the ignition system 10 includes a prior art ignition distributor 12 comprising the usual housing or base 14 having a shaft 16 driven by the engine 18, the shaft having the usual distributor cam 20 secured or formed thereon for actuating the breaker contacts 22, the detailed structure of which is well known in the art and need not be described further. The movable contact arm 24 is mounted upon a movable advance plate 26 pivotally secured to the fixed distributor plate 28, as is well known in the art, so that the position of the rubbing block 30 of the movable contact arm 24 with respect to the cam 20 may be varied to advance and retard the spark timing as required for various engine operating conditions.

While the ignition distributor may be of the so-called full pressure type, wherein variation of the spark timing is accomplished solely in response to variations of vacuum in the intake manifold and/or the carburetor, as shown in Larges et al. 3,062,929, the invention is described as applied to an ignition distributor of the mechanical advance type wherein centrifugal weights responsive to engine speed change the relationship between the cam and the rubbing block of the distributor contacts, vacuum operation being limited to part throttle engine operation as shown by Bettoni et al. 3,207,864. In either case, the vacuum operation is accomplished through the arm 32 that is pivotally connected to the movable plate 26 at the pin 34 and that passes through an opening 36 in the distributor housing 14 for attachment to a vacuum responsive assembly.

As explained in the objects of this invention, it is required to provide a single structure that is capable at times of retarding the spark and at other times of advancing the spark. Advancing is provided by the typical structures shown by Larges and Bettoni referred to above, but these structures are not capable of retarding the spark in the manner required. To accomplish the stated objects, the invention includes a novel vacuum diaphragm assembly 38 which may be constructed, for purposes of attachment thereof to the distributor housing 14, with a mounting bracket similar to that of the diaphragm assembly 28 of Bettoni et al. so as to provide convenient interchangeability of prior art and the proposed diaphragm assemblies with the same distributor.

More specifically, the diaphragm assembly 38 may comprise a central cast or otherwise suitably formed annular body 40 having annular flanges 42 and 44 at the opposite ends thereof and an annular spring seat 46 intermediate the ends thereof. A dished cover member 48 having a central opening 50 is secured to the flange 42 in any suitable manner, such as by rolling its flange 52 over the flange 42 with the peripheral edge of a flexible diaphragm 54 therebetween, the diaphragm having a central opening and being supported by the usual diaphragm washers 56 having central openings. The actuating rod or arm 32 pivotally secured to the movable plate 26 is secured at its opposite end to the diaphragm washers 56 in a manner to also secure to the diaphragm 54, on the opposite side of the arm 32, an L-shaped or other suitable link member 58 having an elongated slot 60 formed therein. A mounting bracket 62 is secured to the cover 48, the bracket having an opening 64 aligned with the opening 50 in the cover and being secured to the housing 14 by means of the screws 66. The actuating rod 32 may be provided with a shoulder 68 adapted to engage a stop 70, which may be formed when the opening 64 is formed, for limiting movement of the actuating rod 32 in the spark retarding direction.

A second cover 72 is secured at the opposite end of the body 40 in a manner similar to cover 48, with a second diaphragm 74 therebetween, the diaphragm 74 having a central opening and the usual support washers 76 with openings in which a stem 78 is secured in a manner similar to the attachment of the rod 32, the stem 78 having at the free end thereof a laterally bent portion 80 received in the slot 60. Cover member 72 has secured in the central opening thereof an internally threaded member 82 adapted to receive a fitting for a vacuum line 85, the inner end 84 of the member 82 serving as a stop for the diaphragm 74 and having slots 86 therein providing communication with the chamber 88 when diaphragm 74 is in the position shown in FIG. 1.

It will be noted that diaphragm 74, which will hereinafter be referred to as the secondary diaphragm, has a larger effective area than the diaphragm 54, hereafter referred to as the primary diaphragm. The calibrated coil spring 90, which will be referred to as the secondary spring, is positioned between the secondary diaphragm washer 76 and the annular spring seat 46, while another calibrated coil spring 92, hereafter referred to as the primary spring, is positioned between the two diaphragms 54 and 74. The body 40 is formed at one side thereof with a threaded opening 94 adapted to receive a threaded vacuum line fitting 96 and communicating the chamber 98 between the diaphragms with the vacuum line 100.

The remainder of the ignition system shown by FIG. 1 includes a so-called overrun control valve 102 which is, like the carburetor 104, known in the prior art so that it will not be described in detail. It is believed sufficient to state that the valve assembly 102 is constructed and connected to the diaphragm assembly 38 by vacuum lines 85 and 100 and to the carburetor 104, which has the usual pivotally mounted throttle plate 106 and a single timed vacuum port 108 positioned just above the carburetor throttle when closed, by vacuum line 110 and to the intake manifold by line 112. Thus, with the vacuum lines shown and the engine operating at a manifold vacuum lower than that obtained during engine deceleration, the spring-loaded two-way valve 114 will be in the position shown in FIG. 1, at which time carburetor vacuum at port 108 will be communicated through lines 110 and 100 to the chamber 98 between the diaphragms 54 and 74 and to the chamber 88 formed by the diaphragm 74 and the cover 72.

On the other hand, when vacuum in the engine manifold 18, which is continuously communicated through line 112 to the chamber 116 in the overrun control valve below the diaphragm 118, exceeds idle vacuum, as during closed-throttle engine deceleration, the force of the manifold vacuum acting on the diaphragm 118 will overcome the force of the spring 120 normally holding the valve 114 in the position shown, and move valve 114 downwardly so as to communicate engine manifold vacuum to the chamber 98 between the diaphragms 54 and 74 of the diaphragm assembly 38 through lines 112 and 100 and to prevent communication of vacuum at port 108 to chamber 98. However, since line 85 connects with line 110 on the carburetor side of valve 114, continuous communication of vacuum at port 108 to chamber 88 in the diaphragm assembly 38 will occur.

It should be stated further that the carburetor 104 having the timed port 108 and the manifold vacuum port 120 is a typical existing prior art carburetor used with prior art distributors, permitting its use, unchanged, with the prior art distributor 12, changed only by substituting the novel diaphragm assembly 38 to provide a novel ignition system.

OPERATION

The novel diaphragm assembly 38 is designed so that it not only performs the normal prior art function of advancing the spark timing under part load engine operating conditions, but it also retards the spark timing beyond the normal firing point under certain other engine operating conditions. It has been reported that noxious engine exhaust emissions are reduced if the spark timing is retarded at idle and under other conditions, such as engine deceleration. The diaphragm assembly 38 is capable of retarding the spark under certain desired engine operating conditions, without sacrificing economy and performance under normal road-load and accelerating conditions. Having this basic capability, its specific operation can be tailored to the needs of a particular engine by the use of appropriate prior art vacuum pick-ups and/or vacuum operated spark valves.

Before discussing more fully the operation of the ignition system shown by FIG. 1, it is believed preferable to first describe the operation of a comparatively simple system 10' comprising a combination of the distributor 12, the diaphragm assembly 38 and the carburetor 104 shown in FIG. 1, without the valve assembly 102. In this simple system shown by FIG. 2, the primary chamber 98 of assembly 38 is connected by a vacuum line or conduit 122 to the intake manifold port 120 and the secondary vacuum chamber 88 is connected by a conduit 124 to the timed carburetor vacuum port 108 located so that it is above the closed throttle plate and senses essentially atmospheric pressure at engine idle operation.

Because of this location of the vacuum port 108, the secondary diaphragm 74 senses a pressure (or vacuum) differential whenever the engine is running at idle. This pressure differential acts on the secondary diaphragm in such a way as to cause it to move toward the primary diaphragm 54. Simultaneously, the primary diaphragm 54 is subjected to manifold vacuum in chamber 98 and to atmospheric pressure on the opposite side thereof, this pressure differential exerting a force on the primary diaphragm acting in a direction towards the secondary diaphragm 74. It will be noted from FIG. 1 that secondary spring 90 acts in opposition to the force applied to the secondary diaphragm by the pressure differential. It will be further noted that the primary spring 92 acts between the secondary diaphragm and the primary diaphragm, tending to oppose the movement of the two diaphragms toward one another. The secondary spring force 90 and the effective area of the secondary diaphragm 74 can be selected so that the secondary diaphragm is caused to move leftwardly due to the pressure differential across it, which movement will be transmitted to the primary diaphragm 54 first by the primary spring 92 and finally by the link 78 engaging the end of the slot 60 to retard the spark timing.

When the throttle plate 106 is opened, as shown in dotted lines in FIG. 2, the port 108 is subjected to manifold vacuum. Since the secondary diaphragm 74 is thus subjected to manifold vacuum on both sides thereof, it no longer senses a pressure difference, and the secondary spring 90 causes it to shuttle back to its normal position shown in FIG. 1, with the result that the spark timing is advanced by action of the primary diaphragm 54. In other words, once port 108 is subjected to manifold vacuum, then as the throttle plate position and manifold vacuum are changed in relation to the road load, the primary diaphragm 54 senses manifold vacuum and modulates the spark timing as do the standard vacuum advance assemblies, without any influence of diaphragm 74.

It will be apparent that the system shown by FIG. 2 will retard the spark timing at idle or any other time the engine is operating with the throttle closed, such as during closed-throttle deceleration conditions.

Referring now to FIG. 3, which is a graph of spark timing vs. engine r.p.m. illustrating the advantages of the invention over the prior art, curve AHBCD represents a typical optimum spark timing advance curve for wide open throttle operation of standard engines without emission control. This curve represents a compromise that will achieve maximum power output from the engine under wide open throttle conditions without excessive preignition of the fuel. However, to achieve minimum emissions from the engine at idle, the modified curve EGFCD has been achieved with prior art distributors by the simple expedient of mounting the distributor on the engine in a spark retarded relationship, resulting in this curve originating at a retarded spark timing (point E) as compared to the optimum spark timing at point A. It is re-emphasized that the reason for this retarded timing is to reduce the engine emissions at idle.

However, an unfortunate side effect of this retarding of the spark timing of the prior art distributor at idle to reduce emissions is that the spark timing will remain retarded at all low engine speeds. This retard of the timing is detrimental from an engine power output standpoint. In order to achieve maximum power output from the engine, it is desirable to return to the optimum curve AHBCD as soon as possible after the engine speed increases beyond a value comparable to the idling speed.

To provide such a return to the original curve, the centrifugal advance mechanism of retard mounted prior art distributors is recalibrated so that it increases the rate of advance of spark timing from point F to point C. With this increased rate of advance of spark timing, the original optimum curve is duplicated at all engine speeds in excess to those encountered at point C, which is qualitatively shown to be at about 1600 r.p.m.

From a mechanical standpoint, this rapid rate of advance of spark timing from F to C is detrimental since it requires a revision of the centrifugal advance mechanism which inherently increases the loading, friction, and hysteresis of its component parts. Again, as mentioned previously, this revised timing curve has the disadvantage that it provides a relatively retarded spark timing at all speeds less than 1600 r.p.m. With this relatively retarded timing the engine lacks power and responsiveness. Still another disadvantage of the aforementioned modified timing curve, is that the engine spark timing is retarded (point E) during cranking which can result in a poor starting engine especially in cold weather.

Applicant's novel shuttling diaphragm assembly much more closely approximates the optimum spark advance curve and spark timing during cranking. In fact, the centrifugal advance curve for a conventional distributor used with applicant's diaphragm assembly is calibrated to duplicate curve AHBCD. However, the spark retard at idle, which is desirable from an emission standpoint, is achieved not by readjusting the distributor on the engine, but by use of the diaphragm assembly.

During the cranking of the engine shown in FIG. 2, manifold vacuum is low and no vacuum is applied to either the primary chamber or the secondary chamber of the diaphragm assembly. Under this condition, the diaphragm assembly remains at its zero position. This position of the diaphragm plus the original setting on the distributor on the engine results in a spark timing equivalent to point A on FIG. 4. As soon as the engine fires, manifold vacuum increases and is transmitted to the primary chamber of the shuttling diaphragm, causing the secondary diaphragm to shuttle the diaphragm rod to the full retard position. This is true as long as the throttle plate of the carburetor is at idle at which time the secondary chamber responds to atmospheric pressure. This retard of the spark upon engine firing causes the spark timing to retard to point G on the curve, which represents the normal spark timing when the engine is idling under no load. If the engine is accelerated by opening the carburetor throttle plate to its wide open position, vacuum in the manifold and at port 108 is reduced, thereby causing the diaphragms to return to their "no vacuum" positions, returning the spark timing to point H. As the engine speed increases under this wide open throttle condition, the spark timing will follow the curve HBCD. The net result of this curve is that under acceleration conditions throughout the speed range from 0–1600 r.p.m., applicant's novel diaphragm assembly used in conjunction with a standard centrifugal advance calibration will provide the optimum engine spark timing for maximum power with no preignition.

Having described only the structure of the FIG. 1 system and both the structure and operation of the relatively simple FIG. 2 system, the operation of the FIG. 1 system which includes the valve assembly 102 and provides a spark retard upon deceleration, without retarding or otherwise effecting the spark timing at idle, will now be described.

The valve assembly 102 operates to control the application of vacuum to the primary vacuum chamber 98 of the diaphragm assembly 38, it being noted that the secondary vacuum chamber 88 is always connected to the timed carburetor port 108 by conduit 85. The diaphragm spring 120 is selected so that it is strong enough to keep the valve 114 normally raised as shown, to provide communication between the primary chamber 98 and the timed port 108 of the carburetor at normal idle or any other engine operating condition when manifold vacuum does not exceed normal idle vacuum. With the valve in this position there is no pressure differential across the secondary diaphragm 74, regardless of the throttle plate position and it is held against its stop 86 by the secondary spring 90. During this phase of operation, the primary diaphragm 54 modulates the spark timing in the same manner as standard vacuum advance diaphragm assemblies.

However, under deceleration conditions, the manifold vacuum in conduit 112, increases and its action on diaphragm 118 provides a sufficient force to overcome spring 120 and move valve 114 downwardly, thus connecting the primary vacuum chamber 98 directly to manifold vacuum through conduits 120 and 100. Simultaneously, the valve 114 cuts off communication between the carburetor port 108 and the primary chamber 98. If the throttle plate 106 of the carburetor is at the idle position (as is the usual case during rapid decelerations) the secondary vacuum chamber 88 senses the essentially atmospheric pressure at port 108. With manifold vacuum in the primary chamber 98 and atmospheric pressure in the secondary chamber 88, the resultant pressure differential causes the secondary diaphragm 74 and arm 32 to move leftwardly to full retard position. This retarded timing continues until the high decelertaion manifold vacuum drops and spring 120 returns valve 114 to its upper position, at which time the timing returns to its normal setting.

To further illustrate the functional flexibility of the diaphragm assembly 38, reference is made to FIG. 4 which is a fragmentary portion of FIG. 1 illustrating a minor modification, not in the structure of assembly 38 but merely in the connection of the valve assembly 102 between the carbuertor 104 and the diaphragm assembly 38. It will be noted that in the FIG. 1 system the secondary chamber 88 is always connected to the carburetor port 108, the pressure at which varies from essentially atmospheric pressure to manifold vacuum, and that the primary chamber 98 is connected either to manifold vacuum or to the carburetor port 108, depending upon the position of valve 114 of assembly 102. In FIG. 4, on the other hand, the primary chamber 98 is always connected to manifold vacuum while the secondary chamber 88 is connected either to the carburetor port 108 or to manifold vacuum, depending upon the position of valve 114.

This simple modification provides a system which, with the same basic components employed in the FIG. 1 system, will (a) retard the spark at idle, (b) advance the spark normally at part throttle and (c) fully advance, rather than retard, the spark on deceleration. The fully advanced spark on deceleration is due to the fact that high manifold vacuum on deceleration will move valve 114 downwardly so as to communicate this vacuum to both the primary chamber 98 and the secondary chamber 88. With no pressure differential across the secondary diaphragm 74, the secondary spring 90 will move it against its stop 86 and allow the primary diaphragm 54 to move to the right in FIG. 1, advancing the spark to the extent permitted by the lost motion connection between the stem 78 and the slotted link member 58.

Applicant is aware that Arthur 2,087,339 teaches a single diaphragm assembly alleged to effect a greater spark retard at idle and a greater spark advance under part-load than is possible with prior art centrifugal advance mechanisms, for purposes other than emission control. However, it is apparent, from the single diaphragm construction and Arthur's discussion, that the two carburetor vacuum ports 111 and 119 must be positioned very accurately with respect to the throttle plate and to each other because the vacuums obtained therefrom are applied to opposite sides of the diaphragm to create a net force in one direction or the other to retard or advance the spark. It is difficult to maintain such precise relationships between the ports and the throttle plate due to manufacturing tolerances. Further, it has already been pointed out above that machining the carburetor to provide an extra port, particularly a port located between adjacent carburetor bores, represents added cost.

Arthur's structure necessarily requires the sliding or flexing seal 94 because the chambers on opposite sides of the single diaphragm must be leak proof. This type of seal located in an automobile engine compartment have been found to be particularly objectionable because dirt tends to collect in the rod, or the rod may be accidentally bent or otherwise damaged, resulting in malfunction due to added resistance to diaphragm movement. In this respect, applicant's double diaphragm assembly is fool-proof, and any cost disadvantage due to the second diaphragm is believed to be compensated for by improved reliability, which is obviously a prime consideration.

Furthermore, applicant's single assembly can be connected or employed with an additional valve assembly so as to provide a variety of functions, without modification of the carburetor or the distributor. Arthur's structure, on the other hand, is limited to the stated function. Another advantage of applicant's double diaphragm assembly over systems with multiple separate diaphragm assemblies, one for retarding and one for advancing the spark, is reduction of cost since housings need not be duplicated.

The invention has been shown and described in sufficient detail so that one skilled in the art may practice the same. While but one embodiment is shown, modifications may be possible, and no limitations are intended, except as recited in the following claims.

I claim:
1. A pressure responsive device adapted to position the spark timing mechanism of an internal combustion engine ignition distributor, said device comprising a hollow body having a first sealed chamber including a first and second pressure responsive walls, a second sealed chamber on the opposite side of one of said walls so that said first and second chambers have said one wall as a common movable wall therebetween, means for communicating each of said chambers with a source of variable engine produced pressure, means securing the other of said walls to said mechanism, first resilient means urging said walls apart, second resilient means urging said common wall to a stop, lost-motion means operatively connecting said first and second walls, said common wall having an effective area greater than said other wall, whereby said common wall is moved to said stop by said second resilient means and said mechanism is controlled solely by said other wall at all times except when the pressure in said first chamber is a predetermined value lower than the pressure in said second chamber, in which latter event the position of said other wall and said mechanism is influenced by the position of said common wall.

2. A device such as that recited in claim 1, wherein the position of said mechanism is determined by the position of said common wall after said lost-motion connection becomes rigid.

3. A device such as that recited in claim 1, wherein said walls have a common axis, wherein said first resilient means comprises a first coil spring and said second resilient means comprises a second coil spring, said first and second coil springs having a common axis coincident with said common axis of said walls, each end of said first coil spring respectively engaging each of said walls and said second coil spring being positioned between said common wall and a rigid seat positioned between said walls.

4. An ignition system for an internal combustion engine supplied with fuel by a carburetor having a throttle valve, said system comprising an ignition distributor driven by said engine and mounted thereon to provide an optimum reference spark timing during cranking of said engine, first means for modifying the spark timing as a function of engine speed, second means operating independently of said first means and responsive to engine and/or carburetor vacuum for modifying the spark timing in accordance with said vacuums during off idle engine operation to provide maximum efficiency and power without preignition and third means connected to override said second means and responsive to engine vacuum for retarding said spark timing during engine deceleration and engine idle operation to control engine exhaust emissions, said second means comprising a first pressure responsive diaphragm connected to said distributor and said third means comprising a second pressure responsive diaphragm connected to said first diaphragm by lost-motion means, both of said diaphragms being continuously subjected to the pressure at a first port sensing engine vacuum and the other side of said second diaphragm being continuously subjected to the pressure at a second port in said carburetor positioned on the upstream side of said throttle valve when closed and on the downstream side of said throttle upon initial opening movement thereof, said diaphragms being secured in spaced relationship in a common housing providing first and second sealed chambers, said second diaphragm having an effective area greater than that of said first diaphragm and forming a common wall between said first and second chambers, first spring means urging said second diaphragm away from said first diaphragm and toward a stop, second spring means between said diaphragms urging said first diaphragm away from said second diaphragm, said lost-motion connection between said diaphragms permitting said first diaphragm to operate independently of said second diaphragm over the lost-motion distance, and said second diaphragm being effective to overcome the force of said diaphragm when a predetermined minimum pressure differential exists across said second diaphragm.

5. A unitary control device for use in combination with an ignition distributor fixedly secured in relation to and adapted to be driven in timed relation by an internal combustion engine provided with a carburetor having a throttle valve, wherein said ignition distributor is provided with first means for causing an ignition spark in timed relation to engine operation and wherein said engine provides a first source of engine vacuum generated in accordance with engine operation and said carburetor provides a second source of carburetor vacuum generated generally in accordance with the position of said throttle valve, said unitary control device comprising a main housing, first and second pressure responsive diaphragms retained generally within said housing in a manner causing said diaphragms to be in spaced relationship to each other and defining a first chamber common to said diaphragms and a second chamber on the other side of said second diaphragm, connecting means operatively connecting said first diaphragm to said first means so that movement of said first diaphragm effects adjustment of said first means in order to adjust spark timing, second means contained generally within said first chamber and yieldingly urging said diaphragms away from each other, third means carried by said housing and operatively engaging said second diaphragm in a manner yieldingly urging said second diaphragm in a direction away from said first diaphragm and toward a first extreme position, fourth means operatively interconnecting said diaphragms in a manner whereby said fourth means transmits no motion to said first diaphragm upon movement of said second diaphragm toward said first diaphragm until said second diaphragm has first attained a predetermined spaced relationship to said first diaphragm, a first port formed in said housing and communicating with said first chamber, and a second port formed in said housing and communicating with said second chamber, said first diaphragm being effective to vary said spark timing independently of said second diaphragm whenever said first port is placed in communication with said first source of engine vacuum and said second port is placed in communication with said second source of carburetor vacuum and said throttle is moved to a partly opened position, said first diaphragm also being effective to advance said spark timing whenever said first and second ports are both placed in communication with said first source of engine vacuum and said engine is decelerating, said second diaphragm being effective to retard said spark timing whenever said first port is placed in communication with said first source of engine vacuum and said second port is placed in communication with said second source of carburetor vacuum and said engine is at idle operation, said first diaphragm also being effective to vary said spark timing independently of said second diaphragm whenever said first and second ports are both placed in communication with said second source of carburetor vacuum and said throttle valve is moved to a partly opened position, said second diaphragm also being effective to move said first diaphragm and retard said spark timing whenever said first port is placed in communication with said first source of engine vacuum and said second port is placed in communication with said second source of carburetor vacuum and said engine is decelerating, said second diaphragm further being effective to move said rst diaphragm and retard said spark timing whenever said first port is placed in communication with said first source of engine vacuum and said second port is placed in communication with said second source of carburetor vacuum and said engine is at idle operation, said first diaphragm further being effective to modulate spark timing independently of said second diaphragm whenever said first port and said second port are respectively placed in communication with said first and second sources of vacuum and said throttle is moved to a partly opened position, and said second diaphragm also being effective to move said first diaphragm and retard said spark timing whenever said first and said second ports are respectively placed in communication with said first and second sources of vacuum and said engine is decelerating.

6. An ignition system for an internal combustion engine supplied with fuel by a carburetor having a throttle valve, said system comprising an ignition distributor driven by said engine, said ignition distributor having a base fixedly mounted against rotation with reference to said engine to provide optimum spark timing during cranking of said engine, first means for modifying the spark timing as a function of engine speed, source means for producing vacuum in accordance with indicia of engine operation, second means operating independently of said first means and operatively connected to said source means so as to be responsive to said vacuum for modifying the spark timing in accordance with said vacuum during off idle engine operation to provide maximum efficiency and power without preignition, and third means operating independently of said first means and operatively connected to said source means of vacuum so as to be responsive to said vacuum, said third means being effective to at selected periods of engine operation operatively engage said second means in order to override said second means for varying the spark timing from that as determined by said second means to control engine exhaust emissions; said source means including a first source of engine vacuum and a second source of carburetor vacuum, said third means being constructed and arranged with respect to said first source and said second source as to be responsive to the attainment of a predetermined value of engine vacuum in order to retard said spark timing during engine idle operation, said second means comprising a first pressure responsive diaphragm operatively connected to said distributor, said third means comprising a second pressure responsive diaphragm operatively connected to said first diaphragm by lost-motion connecting means, said first source of engine vacuum comprising a first port exposed to said engine vacuum, said second source comprising a second port formed in said carburetor and located so as to be positioned on the upstream side of said throttle valve when said throttle valve is closed and on the downstream side of said throttle valve upon initial opening movement of said throttle valve, both of said diaphragms being continuously subjected to the pressure at said first port, the other side of said second diaphragm being continuously subjected to the pressure at said second port, said second diaphragm having an effective area substantially greater than that of said first diaphragm, and said third means including additional engine vacuum responsive valve means for at times subjecting both of said diaphragms to the pressure at said second port and simultaneously terminating their communication with said first port.

7. An ignition system for an internal combustion engine supplied with fuel by a carburetor having a throttle valve, said system comprising an ignition distributor driven by said engine, said ignition distributor having a base fixedly mounted against rotation with reference to said engine to provide optimum spark timing during cranking of said engine, first means for modifying the spark timing as a function of engine speed, source means for producing vacuum in accordance with indicia of engine operation, second means operating independently of said first means and operatively connected to said source means so as to be responsive to said vacuum for modifying the spark timing in accordance with said vacuum during off idle engine operation to provide maximum efficiency and power without preignition, and third means operating independently of said first means and operatively connected to said source means of vacuum so as to be responsive to said vacuum, said third means being effective to at selected periods of engine operation operatively engage said second means in order to ovirride said second means for varying the spark timing from that as determined by said second means to control engine exhaust emissions, said source means including a first source of engine vacuum and a second source of carburetor vacuum, said third means being arranged with respect to said first source and said second source as to be effective upon the attainment of a first predetermined value of engine vacuum to permit said second means to advance said spark timing during engine deceleration, said third means also being effective upon the attainment of a second predetermined value of engine vacuum less than said first predetermined value to override said second means and retard said spark timing during engine idle operation, said first source comprising a first port exposed to said engine vacuum, said second source comprising a second port formed in said carburetor and located so as to be positioned on the upstream side of said throttle valve when said throttle valve is closed and on the downstream side of said throttle valve upon initial opening movement of said throttle valve, said second means comprising a first pressure responsive diaphragm operatively connected to said distributor, said third means comprising a second pressure responsive diaphragm operatively connected to said first diaphragm by lost-motion connecting means, both of said diaphragms being continuously subjected to the pressure at said first port, and engine vacuum responsive valve means for at times subjecting the other side of said second diaphragm to the said pressure at said first port and at other times to the pressure at said second port in said carburetor, said second diaphragm having an effective area substantially greater than said first diaphragm.

8. An ignition spark timing control mechanism for an engine having an ignition distributor with a member movable in one direction to advance spark and in another direction to retard spark and supplied with fuel by an engine intake manifold-mounted carburetor having an induction passage, a throttle valve in the induction passage and a port open to the induction passage, the port being on the air intake side of the throttle valve when closed to engine idle position and traversed by the throttle valve upon initial opening movement thereof, said mechanism comprising a housing divided into adjacent first and second sealed chambers by spaced parallel first and second pressure responsive walls, said second wall having a larger effective area than said first wall and forming a common wall between said chambers, first resilient means urging said walls apart, second resilient means only urging said common wall away from said first wall, a lost motion connection between said walls, means for connecting said first wall to said movable member, means for communicating a pressure to said first chamber and means for communicating a pressure to said second chamber, said lost motion connection being constructed so as to (a) render said common wall inoperative to affect the positioning of said movable member by said first wall when the pressure differential across said common wall is not sufficient to overcome the force of said second resilient means and thereby permit said first wall to respond independently to said common wall to the pressure in said first chamber and (b) cause said common wall to overcome the force of said second resilient means and prevent and/or override the response of said first wall to the pressure in said first chamber whenever the pressure in said first chamber is a predetermined value less than the pressure in said second chamber.

9. The combination of an engine having an ignition distributor with a member movable in one direction to advance spark and in another direction to retard spark and supplied with fuel by an engine intake manifold-mounted carburetor having an induction passage, a throttle valve in the induction passage and a port open to the induction passage, the port being on the air intake side of the throttle valve when closed to engine idle position and traversed by the throttle valve upon initial opening movement thereof, and an ignition spark timing control mechanism for said distributor, said mechanism comprising a housing secured to said distributor and divided into adjacent first and second sealed chambers by spaced parallel first and second pressure responsive walls, said second wall having a larger effective area than said first wall and forming a common wall between said chambers, first resilient means urging said walls apart, second resilient means urging said common wall away from said first wall, a lost motion connection between said walls, means connecting said first wall to said movable member, means communicating a pressure to said first chamber, and means communicating a pressure to said second chamber, said lost motion connection being constructed so as to (a) render said common wall inoperative to affect the positioning of said movable member by said first wall when the pressure differential across said common wall is not sufficient to overcome the force of said second resilient means and thereby permit said first wall to respond independently to said common wall to the pressure in said first chamber and (b) cause said common wall to overcome the force of said second resilient means and prevent and/or override the response of said first wall to the pressure in said first chamber whenever the pressure in said first chamber is a predetermined value less than the pressure in said second chamber.

10. Tthe combination recited in claim 9, wherein at all times the pressure communicated to said first chamber is engine manifold pressure and the pressure communicated to said second chamber is the pressure at said port.

11. The combination recited in claim 9, wherein said pressure communicating means are continuously open.

References Cited

UNITED STATES PATENTS

| 2,557,527 | 6/1951 | Colvin et al. | 123—117.1 |
| 3,027,884 | 4/1962 | Bale et al. | 123—117.1 XR |
| 3,162,184 | 12/1964 | Walker | 123—117.1 |
| 3,356,083 | 12/1967 | Clark et al. | 123—117.1 |

LAURENCE M. GOODRIDGE, Primary Examiner

U.S. Cl. X.R.

123—146.5